June 26, 1934.  P. M. BOURDON  1,964,618
VEHICLE WHEEL RIM
Filed March 10, 1933
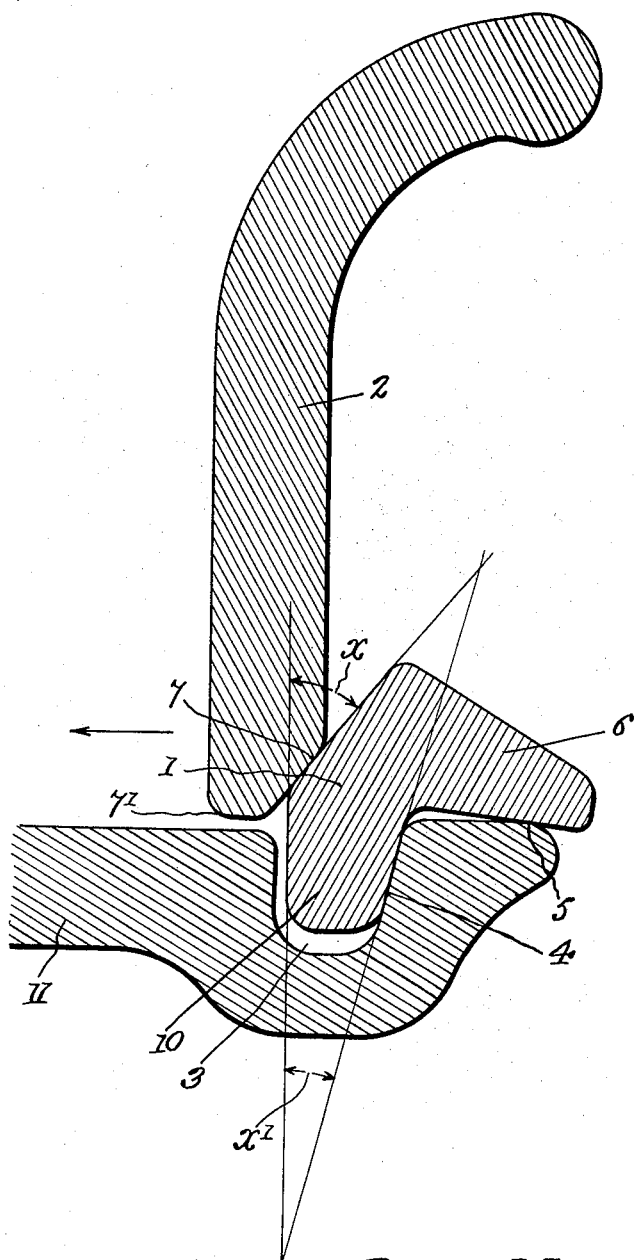
Inventor
Pierre Marcel Bourdon
By Wilkinson & Mawhinney
Attorneys.

Patented June 26, 1934

1,964,618

UNITED STATES PATENT OFFICE 1,964,618

VEHICLE WHEEL RIM

Pierre Marcel Bourdon, Paris, France, assignor to Michelin et Cie, Clermont-Ferrand, France, a corporation of France Application March 10, 1933, Serial No. 660,314
In France July 26, 1932

4 Claims. (Cl. 152—21)

The present invention relates to improvements in vehicle wheel rims and has for an object to provide an improvement in rims having removable side flanges and contemplates a certain mode of mounting of the side flange or side ring.

More particularly the invention relates to rims carrying a side ring which receives the pressure of the tire when it is inflated so as to maintain the ring in place, the rim also carrying a second ring, which is the locking ring and which is a split ring, said second or locking ring being adapted to confine and lock the first ring.

According to the invention the locking ring is given a special cross section which imparts great strength and at the same time maximum lightness and flexibility for mounting. The locking ring is flanged and one of its flanges or branches lies in the annular groove provided in the rim, while the other branch or flange rests on the edge of the rim. The side ring rests on the locking ring, there being an inclined surface on the locking ring constituting a bearing surface of the same inclination as the inclined surface on the side ring or flange. In like manner, the outer wall of the inwardly projecting flange of the locking ring engages the front wall of the rim groove on an inclined plane. The angle of inclination with respect to the vertical is much greater as between the locking ring and the side ring than it is between the locking ring and the wall of the rim groove. In this manner, the flange of the locking ring, which projects into the rim groove, is in the form of a wedge with the projected point of the wedge lying within the rim.

The invention also has for an object an arrangement and device that renders it easy to force the side ring inwardly of the rim and out of contact with the locking ring whereby the locking ring may be removed with great facility either by hand or by foot.

With the foregoing and other objects in view, the invention will be more fully described hereinafter and will be more particularly pointed out in the claims appended hereto.

In the drawing,

The figure is a fragmentary cross section taken vertically through a portion of a rim, side ring and locking ring constructed in accordance with the present invention with the parts in the interlocked condition.

Referring to the drawing, 11 designates a rim and 2 the side ring. The side ring is maintained in place by a locking ring 1 which is a split ring shown in cross section to have a lower flange or wing 10 adapted to occupy an annular groove 3 formed in the outer portion of the rim 11. The locking ring also has a second flange or wing 6 bearing on the edge 5 of the rim.

The locking ring is made in a manner to afford great strength and resistance to strain, and at the same time possesses maximum lightness and flexibility for mounting. Because of this it can be put in place easily either by hand or by foot. The flange 10 of the locking ring 1, which occupies the groove 3, is so constructed that its front face or surface 4, which contacts with the front wall of the groove 3, is inclined radially outward to facilitate the putting in place and removal of the locking ring 1. This arrangement permits facility in manufacturing the rim, the rim being made by a direct rolling of the body of the rim 11 without supplementary flanging or beading operations on the edge 5, as has been the custom. This form is very important from the view-point of cost, and from the view-point of the strength and resistance to strain of the parts of the rim in and about the groove 3. The usual flanging and beading operations strain the metal and render the same weak, forming a weak zone in the rim, which zone is subjected to the greatest strain.

The flange 6 of the locking ring bears on the edge 5 of the rim. This bearing zone is remote or spaced from the flange 10. This bearing on the line 5 resists efforts tending to tilt the locking ring outwardly. The improved locking ring 1 consequently may be made less thick than the ordinary locking ring. While thinner and lighter, the improved locking ring presents a great resistance to strain and a safety factor that is superior to that found in ordinary locking rings. As the flange 6 is spaced from the groove 3 and extends outwardly of the side ring 2 it provides a means to which a tool may be readily applied to mount or demount the locking ring.

The side ring 2 bears on the locking ring 1 by frusto-conical surfaces 7 which assure centering of the side ring on the rim by means of the locking ring. The angle $x$ formed by the inclined edge 7 with the vertical is much greater than the angle $x'$ formed with the vertical by the inclined wall 4 of the groove 3. It therefore results that, under the pressure exerted on the side ring 2 by the tire when it is inflated, the locking ring will be confined in place and there will be a tendency to force the locking ring into the groove 3. The inner edge 7' of the side ring 2 cannot come into contact with the base of the rim 11 and this avoids all risks of the jamming of the side ring 2 on the rim 11.

In attaching and removing the side ring 2, it is useful, in order to facilitate mounting and demounting of the tire, to push back the side ring 2 toward the inner part of the rim 11 whereby to render the locking ring 1 free to be removed or replaced without interference with the side ring 2.

It will be obvious that various changes can be made in the construction, combination and arrangement of parts, which could be made without departing from the spirit of my invention, and I do not mean to limit the invention to such details except as particularly pointed out in the claims.

Having thus described my invention, what I claim and desire to secure by Letters Patent of the United States is:

1. In combination, a rim having an annular groove, a side ring and a locking ring seating in said groove, said side ring and locking ring having conical engaging surfaces supporting the side ring clear of the base of the rim to avoid jamming of the side ring in mounting and demounting the same.

2. In combination, a rim having an annular groove therein, a side ring, and a locking ring, said side ring having an outwardly inclined surface and said locking ring having a confronting bearing surface disposed on the same inclination as the inclined surface of the side ring, said locking ring having a flange entering said groove, the front wall of said flange and groove being tapered in substantially the same direction as the first mentioned mutually inclined surfaces but having a less angle with respect to the axis of the rim than said first mentioned inclined surfaces.

3. In combination, a rim having an annular groove, a side ring, a locking ring having a flange provided with a wedge face entering said groove and having a second horizontal flange engaging the edge of the rim remote from the groove, the front wall of said groove being inclined to receive the wedge face of said first flange, the upper inner edge of the locking ring being inclined to the axis of the rim and inwardly with respect to the rim, said side ring having a conical outer lower edge for sliding upon said inclined surface and being supported by said inclined surface, said side ring being in one piece circumferentially and having its innermost edge spaced from the base of the rim, said locking ring being split and of resilient material.

4. In a wheel rim having a groove, a side ring having an inclined outer face on the inner periphery thereof, and a locking ring engaging in said groove and abutting said inclined face of said side ring, said locking ring having flanges, one of said flanges entering said groove, the front walls of the groove and said one flange being inclined outwardly, the other flange extending outwardly of the groove and providing a means to facilitate mounting and demounting of the locking ring and means to resist tilting of the locking ring outwardly.

PIERRE MARCEL BOURDON.